(12) United States Patent
Derakhshani et al.

(10) Patent No.: US 10,931,455 B2
(45) Date of Patent: Feb. 23, 2021

(54) SECURE IMAGE PIPELINE

(71) Applicant: EyeVerify Inc., Kansas City, MO (US)

(72) Inventors: Reza R. Derakhshani, Shawnee, KS (US); Joel Teply, Shawnee, KS (US); Zikomo Fields, Lake Lotawana, MO (US); Casey Hughlett, Edmond, OK (US)

(73) Assignee: EyeVerify Inc., Kansas City, MO (US)

( * ) Notice: Subject to any disclaimer, the term of this patent is extended or adjusted under 35 U.S.C. 154(b) by 0 days.

(21) Appl. No.: 15/277,112

(22) Filed: Sep. 27, 2016

(65) Prior Publication Data

US 2018/0089789 A1 Mar. 29, 2018

Related U.S. Application Data

(60) Provisional application No. 62/233,727, filed on Sep. 28, 2015.

(51) Int. Cl.
*G06K 9/00* (2006.01)
*H04L 9/32* (2006.01)
(Continued)

(52) U.S. Cl.
CPC .......... *H04L 9/3236* (2013.01); *G06F 21/16* (2013.01); *G06T 1/0028* (2013.01); *G09C 5/00* (2013.01); *G06T 2201/0051* (2013.01)

(58) Field of Classification Search
CPC ... G06T 1/0021; G06T 1/0028; G06T 1/0035; G06T 1/0042; G06T 1/005; G06T 1/0057; G06T 1/0064; G06T 1/0071; G06T 1/0078; G06T 1/0085; G06T 1/0092; G06T 2201/005; G06T 2201/0051;
(Continued)

(56) References Cited

U.S. PATENT DOCUMENTS 7,093,299 B1 * 8/2006 Kamijo ................ H04N 1/2112
713/168
7,216,232 B1 * 5/2007 Cox ....................... G06T 1/0021
713/176
(Continued)

FOREIGN PATENT DOCUMENTS

EP 1280104 A2 1/2003
WO WO-02/101648 A2 12/2002

OTHER PUBLICATIONS

Friedman ("The trustworthy digital camera: restoring credibility to the photographic image", 1993).*
(Continued)

*Primary Examiner* — Avinash Yentrapati
(74) *Attorney, Agent, or Firm* — Goodwin Procter LLP

(57) ABSTRACT

Computer-implemented methods and systems for image security in computer vision applications are described. A shared secret is stored at an image sensor module and a trusted element. The shared secret includes a device-specific secret value and a definition of a plurality of pixel locations. An image is received at the image sensor module, which generates a watermark based on the secret value and applies the watermark to the image, based on the pixel locations, to create a watermarked image. The watermarked image is received at the trusted element, which validates the watermarked image based on the watermark.

20 Claims, 3 Drawing Sheets

(51) Int. Cl.
*G06F 21/16* (2013.01)
*G06T 1/00* (2006.01)
*G09C 5/00* (2006.01)

(58) Field of Classification Search
CPC ..... G06T 2201/0052; G06T 2201/0053; G06T 2201/061; G06T 2201/0062; G06T 2201/0065; G06T 2201/0081; G06T 2201/0083; G06T 2201/0202; G06T 2201/0203; G06T 2201/0201; G06T 2201/0601
See application file for complete search history.

(56) References Cited

U.S. PATENT DOCUMENTS

| | | | | |
|---|---|---|---|---|
| 7,663,670 | B1* | 2/2010 | Orboubadian | H04N 1/2112 348/231.2 |
| 8,027,468 | B2* | 9/2011 | McCloskey | G06K 9/00577 380/200 |
| 9,104,840 | B1* | 8/2015 | Paczkowski | G06F 21/00 |
| 2001/0025342 | A1* | 9/2001 | Uchida | H04L 9/3231 713/186 |
| 2002/0056043 | A1* | 5/2002 | Glass | G06F 21/32 713/179 |
| 2002/0114452 | A1* | 8/2002 | Hamilton | H04N 1/32101 380/42 |
| 2002/0141582 | A1* | 10/2002 | Kocher | G11B 20/00086 380/201 |
| 2003/0012406 | A1* | 1/2003 | Iwamura | H04N 1/32203 382/100 |
| 2003/0070075 | A1* | 4/2003 | Deguillaume | G06T 1/0042 713/176 |
| 2003/0123701 | A1* | 7/2003 | Dorrell | G06F 21/64 382/100 |
| 2003/0231785 | A1* | 12/2003 | Rhoads | G06F 21/10 382/100 |
| 2004/0153649 | A1* | 8/2004 | Rhoads | G06F 17/241 713/176 |
| 2005/0004873 | A1* | 1/2005 | Pou | G06F 21/10 705/51 |
| 2005/0036652 | A1* | 2/2005 | Kesal | G06F 21/16 382/100 |
| 2005/0081040 | A1* | 4/2005 | Johnson | G06F 21/32 713/176 |
| 2005/0242568 | A1* | 11/2005 | Long | G07D 7/20 283/72 |
| 2005/0278787 | A1* | 12/2005 | Naslund | G06F 21/10 726/26 |
| 2007/0121997 | A1* | 5/2007 | Harmanci | G06T 1/0064 382/100 |
| 2009/0067685 | A1* | 3/2009 | Boshra | G06F 21/32 382/124 |
| 2009/0067687 | A1* | 3/2009 | Boshra | G06F 21/32 382/124 |
| 2009/0138731 | A1* | 5/2009 | Jin | G06F 21/51 713/194 |
| 2010/0332843 | A1* | 12/2010 | Boivie | G06F 21/125 713/189 |
| 2012/0155634 | A1* | 6/2012 | Baughman | G06T 1/0021 380/28 |
| 2012/0216049 | A1* | 8/2012 | Boivie | G06F 21/57 713/189 |
| 2013/0195273 | A1* | 8/2013 | Lord | H04L 63/0428 380/270 |
| 2013/0301830 | A1* | 11/2013 | Bar-El | H04L 9/08 380/210 |
| 2014/0029809 | A1* | 1/2014 | Rhoads | G06K 9/00442 382/112 |
| 2014/0047548 | A1* | 2/2014 | Bye | G06F 21/74 726/26 |
| 2014/0049653 | A1* | 2/2014 | Leonard | G06T 1/0042 348/207.1 |
| 2014/0321640 | A1* | 10/2014 | Johne | H04N 1/00339 380/28 |
| 2017/0140490 | A1* | 5/2017 | Leonard | G06T 1/0042 |
| 2017/0300670 | A1* | 10/2017 | Horne | G06F 21/16 |

OTHER PUBLICATIONS

Celik, Mehmet Utku, et al. "Lossless generalized-LSB data embedding." IEEE transactions on image processing 14.2 (2005): 253-266. (Year: 2005).*

Blythe et al., (2005) "Secure Digital Camera," Retrieved from the Internet: URL:http://search.proquest.com/docview/305360003. (12 pages).

International Search Report and Written Opinion for International Application No. PCT/US2016/053903 dated Dec. 15, 2016. (13 pages).

* cited by examiner

SECURE IMAGE PIPELINE

CROSS-REFERENCE TO RELATED APPLICATION

This application claims priority to and the benefit of U.S. Provisional Patent Application No. 62/233,727, filed on Sep. 28, 2015, and entitled "Secure Image Pipeline," the entirety of which is incorporated by reference herein.

BACKGROUND

The present disclosure generally relates to image security and, in particular, to systems and methods for secure image capture and delivery for computer vision applications.

Many modern computing platforms have secure and trusted units that can execute code and handle memory contents in a way that conceals and protects sensitive data and computations from potentially unsecure regular execution subsets. However, trusted units usually do not enjoy the full computational power of the unsecured sections of the computing platform. Computer vision applications, such as biometric authentication applications, would benefit from the utilization of both the trusted and untrusted portions of a computing platform in order to balance security and processing efficiency.

SUMMARY

Various implementations of computer-implemented methods and systems for image security in computer vision applications are described herein. In one aspect a computer-implemented method includes: storing a shared secret at an image sensor module and a trusted element, the shared secret comprising a device-specific secret value and a definition of a plurality of pixel locations; receiving an image at the image sensor module; generating, by the image sensor module, a watermark based on the secret value; applying, by the image sensor module, the watermark to the image to create a watermarked image, the applying being based on the pixel locations; receiving the watermarked image at the trusted element; and validating, by the trusted element, the watermarked image based on the watermark.

In one implementation, generating the watermark includes calculating a hash value of a global value and the device-specific secret value. The global value can include at least one of a time and a date. Applying the watermark to the image can include replacing one or more bit values of pixels at each pixel location with one or more bit values of the watermark. The validating can include: extracting the watermark from the watermarked images based on the pixel locations; calculating a hash value of a global value and a device-specific secret value; and comparing the hash value with the watermark.

In another aspect, a computer-implemented method includes: establishing a secure link between an image sensor module and a trusted element; receiving an image at the image sensor module; generating, by the trusted element, a single-use private key and a definition of a region of interest of the image; providing, via the secure link, the private key and the definition of the region of interest to the image sensor module; calculating, at the image sensor module, a first value based on pixel values within the region of interest of the image and the private key; providing, via the secure link, the first value to the trusted element; receiving a copy of the image at the trusted element; calculating, by the trusted element, a second value based on pixel values within the region of interest of the image and the private key; and validating, by the trusted element, the copy of the image based on the first value and the second value.

In one implementation, the first value and the second value include hash values. The validating can include determining whether the second value matches the first value. The method can further include removing all traces of the calculating from the image sensor module. The method can further include performing, by the trusted element, an audit of an operation performed on the image by an untrusted element.

Other aspects of the inventions include corresponding systems and non-transitory computer-readable media. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure is directed to various implementations of methods and systems for secure camera image capture and delivery for computer vision applications, such as biometric authentication applications, in a computationally efficient manner. Generally, the increased efficiency is accomplished by off-loading certain computation intensive image handling procedures to untrusted or unsecure units in a computing platform while checking the integrity and authenticity of the image processing using less computationally intensive routines in trusted or otherwise secure units of the computing platform.

Figure 1:
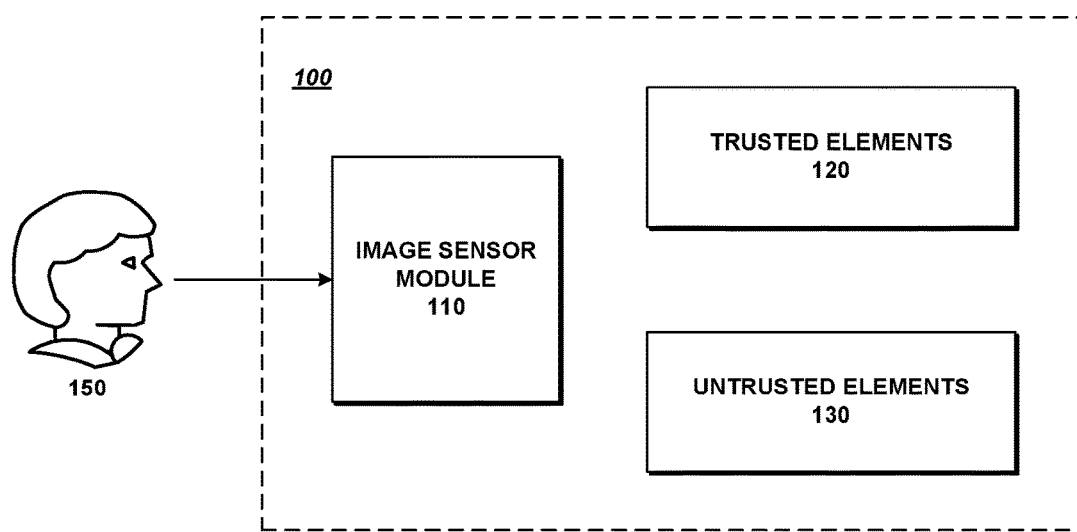
FIG. 1 depicts an example system architecture for a secure image pipeline according to an implementation.

FIG. 1 depicts an example system architecture for a secure image pipeline, in which computing device 100 includes an image sensor module 110, trusted elements 120, and untrusted elements 130. Computing device 100 can be a mobile device, such as a smartphone, tablet, or laptop, or other device having a processor, memory, and image capture functionality. Image sensor module 110 can include hardware such as a digital camera for capturing images of a user 150, processing elements, and memory for storing image data and the algorithms described herein. Trusted elements 120 can include secure hardware, such as a secure cryptoprocessor implementing the Trusted Platform Module (TPM) standard, as well as software, such as a biometric authentication application, executing in a secure space. Untrusted elements 130 can include unsecure hardware, such as standard processors, memories, and storage devices that are vulnerable to intrusion, tampering, or data interception, whether on account of operating with unencrypted instructions/data or otherwise. Untrusted elements 130 can also include software executing in an unsecure space. In some implementations, the image sensor module 110, trusted elements 120, and/or untrusted elements 130 also have access to dynamic global values such as device date and time. It is to be appreciated that the various components of the computing device 100 can also be separated into multiple computing devices which can communicate, for example, over a network.

Figure 2:
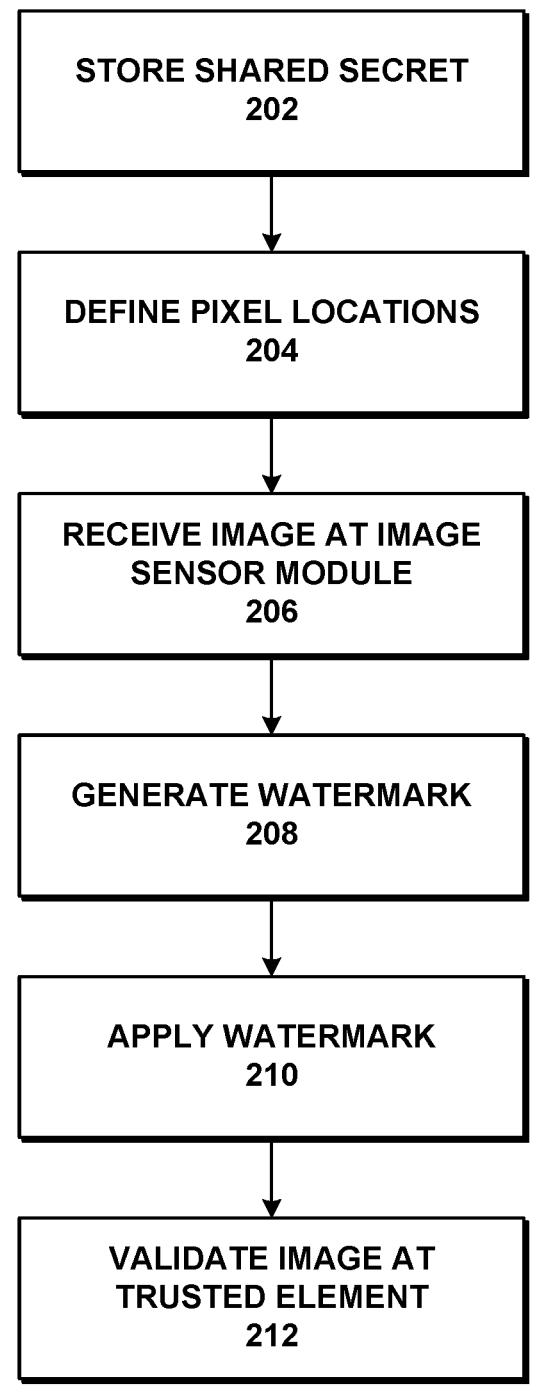
FIG. 2 depicts an example method for secure image validation according to an implementation.

Referring now to FIG. 2, in one implementation, there is no secure two-way pipeline between image sensor module 110 and trusted elements 120, but each stores a private, shared secret in the form of a watermarking algorithm that cannot be accessed or otherwise inferred by a third party (STEP 202). The algorithm can be embedded in secure memory of the image sensor module 110 and trusted elements 120 upon creation or initial programming of the computing device 100, and thereby remains a secret between the aforesaid components thereafter.

In STEP 204, the watermarking algorithm shared by the image sensor module 110 and trusted elements 120 can define a set of pixel locations, which can be, for example, an ordered predetermined set or randomly determined set based on a value known to both components 110 and 120, such as the current time. Upon capturing an image (STEP 206), image sensor module 110 uses a hash of a current time/date stamp+a device-specific secret value to generate a time-varying binary string (watermark) (STEP 208). The binary string can include a number of bits that corresponds to the number of pixel locations in the defined set. In STEP 210, the watermark is applied to the image by respectively inserting the individual bits of the binary string into the least significant bit (LSB) of either Red, Green, or Blue bytes/registers of the pixel locations. Other bit locations, as well as other techniques for generating and applying the watermark are contemplated.

The image data can then be sent to the untrusted elements 130 (e.g., central processing unit and accompanying computing device hardware and software) to perform computationally-intensive and/or other operations on the image, such as biometric feature extraction and analysis. A copy of the watermarked image data is also provided to trusted elements 120 for validation (STEP 212). In validating the image, trusted elements 120 execute the shared secret algorithm to produce a hash value of the device-specific key+global value (e.g., time/date stamp). Trusted elements 120 further extract the watermark from the watermarked image using knowledge of the shared secret pixel locations, and compare the bits of the hash value with the corresponding bits of the pixels (e.g., the LSBs) to determine whether the image has been tampered with. If the hash value independently computed by the trusted elements 120 matches the bit values extracted from the watermarked image, the image is presumed valid.

The above technique has a number of advantages. For example, the time-element that factors into the calculation of the watermark negates the chances of replays of intercepted images. Further, the sparse insertions of the binary string bits into the LSBs of the pixels make the watermark imperceptible. The watermark can be applied after image alterations performed by the image sensor module 110, such as compressions and corrections, unless those operations are known to the trusted elements 120 and performed on the receiving end as well to find the transformed LSB values. Other watermarking methods, such as using the lesser principle components, energy segmentation (like in seam carving), Barker code position modulation (BCPM) (e.g., a combination of 7, 11 and 13 chips based on a circular lookup table using a seed material) are also contemplated. Various other forms of shared secrets are also contemplated.

In another example, a watermarking technique can include encoding the least significant four bits of 12-bit raw pixels values with a secret watermark distributed by a shared secret random number generator seeded with clock of the image sensor module 110. The locations of the watermarked pixels can be salted by a map of dead pixels that are erroneously stuck to high values when no light is exposed on the sensor. These pixels groups generally grow over time and can be found by performing a zero exposure capture shortly after the startup of the image sensor module 110. Other information can be injected into the aforementioned dead pixels, as they no longer carry useful image data.

Figure 3:
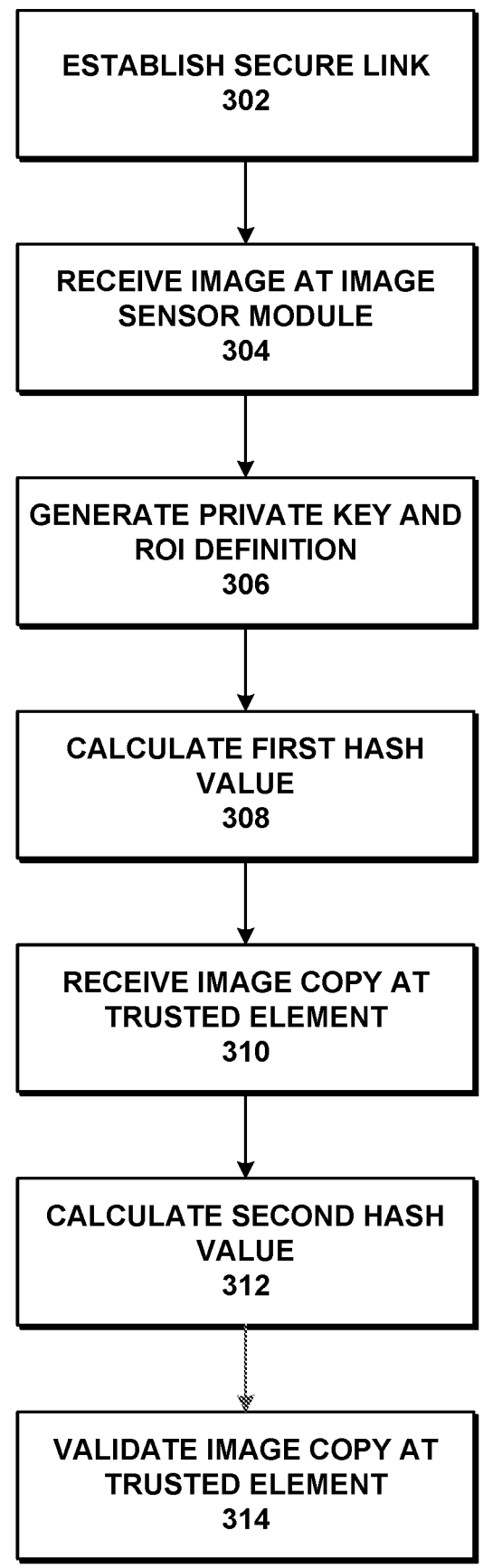
FIG. 3 depicts an example method for secure image validation according to an implementation.

Referring now to FIG. 3, in another implementation, a secure/trusted two-way pipeline (link) is established between image sensor module 110 and trusted elements 120 (STEP 302). The secure link can be established if the privacy of a secret algorithm stored in image sensor module 110 cannot be ensured, or if the use of a private secret or watermarking technique shared between image sensor module 110 or trusted elements 120 is not secure or is otherwise inappropriate for a particular device or application. In essence, this technique involves deriving and subsequently verifying a one-time (single-use) dynamic hash of a requested portion of an image by signing it with a one-time private key, performed in a challenge-response manner via the secure two-way link between trusted elements 120 and image sensor module 110. Other similar methods are contemplated to achieve this functionality.

In STEP 304, an image is received at image sensor module 110 (e.g., by capturing the image with camera hardware). Trusted elements 120 generate secret values including a one-time private key and coordinates defining an image region of interest (ROI) (STEP 306) and provide, via the secure link, the one-time secret values to image sensor module 110. The secret values can be produced, for example, by a dynamically seeded cryptographically secure pseudo random number generator in trusted elements 120.

In STEP 308, after receiving the secret values, image sensor module 110 creates a hash of pixel values within the requested ROI salted by the private key (e.g., a hash of a cyclic redundancy check of the ROI+private key). The resulting binary digest is then sent back to trusted elements 120 via the secure link, and all the traces of the image data, secret values, and related operations can be erased from the image sensor module 110.

Image sensor module 110 can send the image data to untrusted elements 130 (e.g., central processing unit and accompanying computing device hardware and software) to perform computationally-intensive and/or other operations on the image, such as biometric feature extraction and analysis. Trusted elements 120 also receive a copy of the image (STEP 310) and repeat the hashing of the ROI with the salt (private values that only the trusted elements 120 have knowledge of) (STEP 312).

In STEP 314, trusted elements 120 validate the image copy by determining if the independently calculated hash is a match for the binary digest received from the image sensor module 110. Upon such positive verification of an image (whether using the above or another method), trusted elements 120 can proceed with further functionality relevant to the current application. For example, for a biometric verification application, trusted elements 120 can proceed with key generation from the active subset of augmented template resulting from the verification template match derived from the validated image.

To ensure that the validated image is not bypassed in image preprocessing, feature extraction, or other functions, by an attacker (e.g., by replacing the final features coming from a validated image sensor with those of the attacker), trusted elements 120 can have on-demand audits of random sections of processing results from the untrusted elements 130. In one implementation, an audit involves determining if the trusted elements 120 can reproduce the same validation result from a previously validated image at the entry point of an image enhancement and/or feature extraction pipeline of untrusted elements 130. In other words, trusted elements 120 can specify a tile/location(s) (random or predefined) in the previously validated image and repeat the computations of the untrusted elements 130 only for that tile (from preprocessing to feature extraction). Trusted elements 120 can then ensure the results of the tile from both trusted and untrusted elements 120 and 130 are consistent.

Another data integrity and validity method can include checking time lapse between an image capture request to receiving the image, quality checks, enhancements, and finally feature extraction by trusted elements 120 to determine if the timing for execution of certain code blocks are reasonable and as expected, thereby ensuring that a malicious process or code is not inserting itself or its results in the legitimate code execution flow of the untrusted elements 130.

The systems and techniques described here can be implemented in a computing system that includes a single computing device, or that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other. In some embodiments, a server transmits data (e.g., image data) to a client device (e.g., for purposes of displaying data to and receiving a response to an operation performed on the data). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

For example, in one implementation, biometric authentication software, executing as part of trusted elements 120, untrusted elements 130, or a hybrid thereof, can be a secure enclave that implements any of the above-mentioned schemes between image sensor module 110 and trusted elements 120 and/or untrusted elements 130. For instance, the biometric authentication software can verify an embedded watermark or use a public key infrastructure (PKI) to verify the authenticity of a received image by exchanging the public key with image sensor module 110. Other configurations, however, are contemplated as well.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   storing a shared secret at both of an image sensor module in a computing device and a trusted element in the computing device, the shared secret comprising a device-specific secret value and a definition of a plurality of pixel locations;
   receiving an image at the image sensor module;
   generating, by the image sensor module, a watermark based on the secret value;
   applying, by the image sensor module, the watermark to the image to create a watermarked image, the applying being based on the pixel locations, wherein the applying comprises replacing a plurality of bit values of a pixel at each pixel location with a plurality of bit values of the watermark;
   performing, at an untrusted element, operations on the watermarked image to generate image processing results;
   receiving the watermarked image at the trusted element;
   validating, by the trusted element, the watermarked image based on the watermark; and
   performing, at the trusted element, an audit of sections of the processing results to determine whether the trusted element can reproduce a previous validation of the watermarked image, wherein performing the audit comprises:
   following validation of the watermarked image, specifying, by the trusted element, a tile in the watermarked image;
   generating audit results by repeating the operations performed by the untrusted element on the tile in the watermarked image, the operations comprising image pre-processing and feature extraction; and
   ensuring that the audit results are consistent with the processing results.

2. The method of claim 1, wherein generating the watermark comprises calculating a hash value of a global value and the device-specific secret value, wherein the global value comprises a dynamic variable accessible to both the image sensor module and the trusted element.

3. The method of claim 2, wherein the global value comprises at least one of a time and a date.

4. The method of claim 1, wherein the validating comprises:
   extracting the watermark from the watermarked images based on the pixel locations;
   calculating a hash value of a global value and a device-specific secret value; and
   comparing the hash value with the watermark.

5. A system comprising:
   at least one memory for storing computer-executable instructions;
   at least one processing unit for executing the instructions stored on the memory, wherein execution of the instructions programs the processing unit to perform operations comprising:
   storing a shared secret at both of an image sensor module in a computing device and a trusted element in the computing device, the shared secret comprising a device-specific secret value and a definition of a plurality of pixel locations;
   receiving an image at the image sensor module;
   generating, by the image sensor module, a watermark based on the secret value;
   applying, by the image sensor module, the watermark to the image to create a watermarked image, the applying being based on the pixel locations, wherein the applying comprises replacing a plurality of bit values of a pixel at each pixel location with a plurality of bit values of the watermark;
   performing, at an untrusted element, operations on the watermarked image to generate image processing results;
   receiving the watermarked image at the trusted element;
   validating, by the trusted element, the watermarked image based on the watermark; and
   performing, at the trusted element, an audit of sections of the processing results to determine whether the trusted element can reproduce a previous validation of the watermarked image, wherein performing the audit comprises:
   following validation of the watermarked image, specifying, by the trusted element, a tile in the watermarked image;
   generating audit results by repeating the operations performed by the untrusted element on the tile in the watermarked image, the operations comprising image pre-processing and feature extraction; and ensuring that the audit results are consistent with the processing results.

6. The system of claim 5, wherein generating the watermark comprises calculating a hash value of a global value and the device-specific secret value, wherein the global value comprises a dynamic variable accessible to both the image sensor module and the trusted element.

7. The system of claim 6, wherein the global value comprises at least one of a time and a date.

8. The system of claim 5, wherein the validating comprises:
   extracting the watermark from the watermarked images based on the pixel locations;
   calculating a hash value of a global value and a device-specific secret value; and
   comparing the hash value with the watermark.

9. The method of claim 1, wherein the trusted element comprises at least one of a secure hardware element and software executing in a secure space.

10. The method of claim 1, wherein the plurality of pixel locations comprises a predefined set of pixel locations.

11. The method of claim 1, wherein the pixel locations are selected based on a value known to the image sensor module and the trusted element.

12. The method of claim 1, further comprising performing, by the image sensor module, one or more alterations on the image prior to the applying of the watermark.

13. The method of claim 1, further comprising performing, by the image sensor module, one or more alterations on the image following the applying of the watermark; and
   wherein the validating comprises compensating for transformed values at the pixel locations resulting from the one or more alterations performed on the image.

14. The system of claim 5, wherein the trusted element comprises at least one of a secure hardware element and software executing in a secure space.

15. The system of claim 5, wherein the plurality of pixel locations comprises a predefined set of pixel locations.

16. The system of claim 5, wherein the pixel locations are selected based on a value known to the image sensor module and the trusted element.

17. The system of claim 5, wherein the operations further comprise performing, by the image sensor module, one or more alterations on the image prior to the applying of the watermark.

18. The system of claim 5, wherein the operations further comprise
   performing, by the image sensor module, one or more alterations on the image following the applying of the watermark; and
   wherein the validating comprises compensating for transformed values at the pixel locations resulting from the one or more alterations performed on the image.

19. The method of claim 1, wherein the plurality of bit values of a pixel comprise four least significant bits of raw pixel values.

20. The system of claim 5, wherein the plurality of bit values of a pixel comprise four least significant bits of raw pixel values.

* * * * *